(No Model.)
E. C. MERRILL.
ARTIFICIAL TOOTH.
No. 495,898. Patented Apr. 18, 1893.
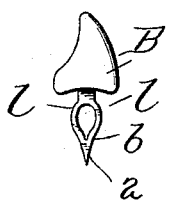
Fig. 1.
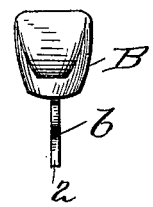
Fig. 2.
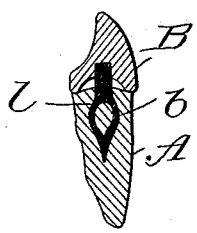
Fig. 3.
Fig. 4.
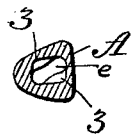
Fig. 4ᵃ
Attest
Walter Donaldson
F. L. Middleton
Inventor
E. C. Merrill
by Ellis Spear
Atty.

UNITED STATES PATENT OFFICE.

EDWARD C. MERRILL, OF FARMINGTON, MAINE.

ARTIFICIAL TOOTH.

SPECIFICATION forming part of Letters Patent No. 495,898, dated April 18, 1893.

Application filed June 30, 1892. Serial No. 438,573. (No model.)

*To all whom it may concern:*

Be it known that I, EDWARD C. MERRILL, a citizen of the United States of America, residing at Farmington, in the county of Franklin and State of Maine, have invented certain new and useful Improvements in Artificial Teeth, of which the following is a specification.

My invention relates particularly to the connection between the artificial crown and the root of a tooth.

My object is to simplify the construction and to form a more secure connection.

The invention consists essentially of a pin or shank embedded in the crown of a tooth and having shoulders adapted to fit under corresponding shoulders in the root of the tooth; and the invention also includes details of construction, all as hereinafter explained.

The invention is further illustrated in the accompanying drawings, in which:—

Figure 1, shows the crown with its pin or shank in side elevation. Fig. 2, shows the same one-fourth turned. Fig. 3, shows the crown and root in section. Fig. 4, shows the face of the root with the cavity indicated in dotted lines. Fig. 4$^a$, is a cross section of the root with the relative position of slot shown by full lines.

The drawings are on an enlarged scale for the purpose of showing more clearly the parts.

In the figures A represents the root and B the crown. The crown is made in the ordinary manner with the pin or shank $b$, embedded in it in the manufacture. Preferably for convenience in fitting, the face of the crown around the shank is made hollow, as shown in Fig. 3. The shank is formed with shoulders 1 1 with a central opening, as shown, in the width of the shank. The lower part is preferably formed with a point 2.

In applying my improved crown and its connecting device to the root of a tooth I enlarge the cavity in the root so as to form shoulders 3, 3, that is to say, the entrance into the cavity is narrower in the plane of the lateral enlargements than the space below the entrance, and these lateral enlargements forming the shoulders in the root of the tooth are exactly fitted to receive and conform to the shoulders of the shank or pin. In order to introduce the pin into the cavity of the root I cut a slot $e$ in the top of the root at an inclination to the plane of the shank. This slot is cut from the outer face of the root downward and is just sufficient to admit the pin by turning the same to bring the plane of the pin to correspond with the plane of the slot. After the enlargements on the pin have passed through the slot then the crown is turned to bring the enlargements of the pin under the shoulders of the root, and while the crown and pin are so held, the crown is securely connected with the root by the interlocking of the shoulders on the pin and root.

It will be noticed that the cavity is filled with cement sufficiently soft to allow the parts to be united in the proper position and adapted subsequently to harden so as to retain them in that position.

In order to properly fit the shank to the cavity the shoulders may be enlarged by a spreading instrument inserted in the opening.

I claim as my invention—

1. A crown for teeth having a shank or pin embedded in said crown and formed with shoulders fitted under corresponding shoulders in the root substantially as described.

2. In combination with the root having an elongated cavity therein, and a slot in the face of the root leading to said cavity and arranged diagonally thereof, a crown having a pin adapted to be inserted in the cavity, said pin having shoulders adapted to fit under the overhanging edges of the slot, substantially as described.

3. The method hereinbefore described of connecting a crown to teeth the same consisting in forming the crown with a shank having shoulders and also in forming in the cavity of the root corresponding shoulders and a diagonal slot then inserting the shank through the diagonal slot and then turning it, and in holding it by the application of cement, substantially as described.

In testimony whereof I affix my signature in presence of two witnesses.

EDWARD C. MERRILL.

Witnesses:
ELMER E. RICHARDS,
BENJAMIN GOODWIN.